United States Patent
Ott

(10) Patent No.: US 11,754,789 B2
(45) Date of Patent: *Sep. 12, 2023

(54) FIBER OPTIC CONNECTOR WITH UNITARY HOUSING AND FIBER OPTIC CONNECTOR ASSEMBLY

(71) Applicant: COMMSCOPE TECHNOLOGIES LLC

(72) Inventor: Michael James Ott, Hudson, WI (US)

(73) Assignee: CommScope Technologies LLC, Hickory, NC (US)

(*) Notice: Subject to any disclaimer, the term of this patent is extended or adjusted under 35 U.S.C. 154(b) by 17 days.

This patent is subject to a terminal disclaimer.

(21) Appl. No.: 17/511,291

(22) Filed: Oct. 26, 2021

(65) Prior Publication Data
US 2022/0113475 A1  Apr. 14, 2022

Related U.S. Application Data

(63) Continuation of application No. 16/639,686, filed as application No. PCT/US2018/046256 on Aug. 10, 2018, now Pat. No. 11,169,332.

(60) Provisional application No. 62/547,490, filed on Aug. 18, 2017.

(51) Int. Cl.
*G02B 6/38* (2006.01)
(52) U.S. Cl.
CPC ................... *G02B 6/3821* (2013.01)
(58) Field of Classification Search
CPC .. G02B 6/3821; G02B 6/3825; G02B 6/3826; G02B 6/3887; G02B 6/389; G02B 6/3893
USPC .............................................. 385/60, 72, 78
See application file for complete search history.

(56) References Cited

U.S. PATENT DOCUMENTS

| | | | |
|---|---|---|---|
| 5,317,663 A | 5/1994 | Beard et al. | |
| 5,420,951 A | 5/1995 | Marazzi et al. | |
| 5,588,080 A | * 12/1996 | Kawamura | G02B 6/3855 385/72 |
| 6,135,644 A | 10/2000 | Hakogi et al. | |
| 6,276,840 B1 | 8/2001 | Weiss et al. | |
| 9,500,817 B2 | 11/2016 | Coffey et al. | |
| 2002/0168148 A1 | 11/2002 | Gilliland et al. | |
| 2004/0072454 A1 | 4/2004 | Nakajima et al. | |
| 2004/0228582 A1 | 11/2004 | Yamada et al. | |
| 2005/0281509 A1 | 12/2005 | Cox et al. | |
| 2015/0378109 A1 | 12/2015 | Samal et al. | |
| 2017/0212313 A1 | 7/2017 | Elenabaas et al. | |
| 2018/0284362 A1* | 10/2018 | Kadar-Kallen | G02B 6/3893 |

FOREIGN PATENT DOCUMENTS

JP   S61-219013 A   9/1986

OTHER PUBLICATIONS

International Search Report and Written Opinion of the International Searching Authority for International Patent Application No. PCT/US2018/046256 dated Dec. 6, 2018, 11 pages.

* cited by examiner

*Primary Examiner* — Robert Tavlykaev
(74) *Attorney, Agent, or Firm* — Merchant & Gould P.C.

(57) ABSTRACT

Fiber optic connectors, including SC connectors having a unitary housing that supports a ferrule and also allows for disengagement and release of the connector from, e.g., an adapter. The unitary housing includes a pair of release arms pivotal relative to a main body of the unitary housing, where pivoting of the release arms enables engagement and disengagement of corresponding latch arms in an adapter, for example.

13 Claims, 13 Drawing Sheets

FIBER OPTIC CONNECTOR WITH UNITARY HOUSING AND FIBER OPTIC CONNECTOR ASSEMBLY

CROSS-REFERENCE TO RELATED APPLICATION

This application is a continuation of U.S. patent application Ser. No. 16/639,686, filed on Feb. 17, 2020, now U.S. Pat. No. 11,169,332, which is a National Stage Application of PCT/US2018/046256, filed on Aug. 10, 2018, which claims the benefit of U.S. Patent Application Ser. No. 62/547,490, filed on Aug. 18, 2017, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The optical cables carry optical fibers that transmit optical signals. Networking and distributing the data-transmitting optical fibers typically requires coupling optical fibers to each other, e.g., by connecting one or more "input" fibers to one or more "output" fibers, which route signals to/from one or more destinations, such as homes, businesses, or particular pieces of hardware, such as computers, etc.

Coupling of optical fibers can take place at, e.g., fiber distribution panels such as patch panels, at or within telecommunications closures, or other distribution equipment. Coupling of optical fibers to each other can include one or more of optical splices, optical connectors, and/or optical alignment devices.

Optical connectors are commonly employed to couple optical fibers to one another, particularly when a high density of optical coupling is required in a limited space, e.g., at a patch panel. Different optical connectors can be used depending on the user's specific connectorization needs. For example, optical connectors can be ruggedized for outdoor or extreme environments. In addition, optical connectors can be single fiber connectors or multi-fiber connectors, such as MPO connectors.

Optical connectors can also vary in form factor, which are standardized within the industry by the Telecommunications Industry Association (TIA). Examples of single fiber connectors having different standardized form factors are SC and LC connectors. The standardization protocol requires, for example, that all SC connectors be compatible/interchangeable with SC adapters and SC termination receptacles. The particular standard is governed by the Fiber Optic Connector Intermateability Standard (FOCIS) for SC connectors (FOCIS 3). FOCIS 3 covers, for example, adapter interface dimensions, adapter sleeve characteristics, adapter mounting characteristics, adapter keying characteristics, connector interface dimensions, ferrule characteristics, etc.

Typical SC connectors include an inner housing and an outer housing that moves relative to the inner housing. The inner housing supports a ferrule that terminates the optical fiber. Pairs of SC connectors are coupled to each other via some sort of adapter which optically aligns and couples the ferrule faces of the two connectors. Typically, the ferrule is spring loaded in its respective connector inner housing to improve coupling and optical transmission at the ferrule face. The outer housing of a typical SC connector is axially movable relative to the inner housing. Shoulders or protruding catches on either side of the inner housing of the SC connector snap into complementary features of an optical adapter or other compatible termination receptacle. The outer housing includes windows that expose the inner body shoulders. The outer body, by axially sliding relative to the inner body, cooperates with the inner body to release the connector from the adapter or other termination device. A technician can grasp the outer housing and pull back to actuate this release mechanism.

A prior art SC connector and SC adapter are described in U.S. Pat. No. 5,317,663, filed May 20, 1993, which disclosure is incorporated by reference herein in its entirety.

There is a need for simplified fiber optic connectors, including SC connectors, having fewer parts and improved release mechanisms.

SUMMARY

In general terms, the present disclosure is directed to a fiber optic connector having a unitary housing that includes an integrated connector release mechanism. The connector release mechanism can be easily accessed, grasped and operated by a technician, even among telecommunications equipment having a high density of connectors. In addition, the unitary construction is simplified and there are fewer separable parts that must coordinate with one another to operate the connector.

Features of the disclosed connector will be described with specific reference to an SC form factor connector and a corresponding SC adapter. However, principles and features of the connectors disclosed herein are not limited to SC connectors, and can be applied to other optical connector form factors, whether commercially practiced now or in the future. Moreover, principles and features of the connectors disclosed herein need not be limited to fiber optic connectors, but can be employed in other connectors, such as electrical/copper connectors, hybrid electrical/optical connectors, etc., particularly in situations in which it is desirable to reduce the number of parts of the connector and/or to simplify or modify a connector's release mechanism.

Connectors in accordance with the present disclosure can be adapted to connectorize single fibers to each other or sets of multiple fibers to each other.

Connectors in accordance with the present disclosure can be "splice on" connectors in which one or more fibers are spliced to a fiber stub or stubs pre-installed in the connector housing. According to some of these examples, the splice or splices can be housed in a splice volume defined by the connector. Alternatively, the splices can be provided outside the connector.

Connectors in accordance with the present disclosure need not be "splice on." For example, an optical fiber can be terminated and processed in the connector without being spliced.

Connectors in accordance with the present disclosure support one or more ferrules. The ferrules can be spring biased (i.e., axially movable against a spring) or fixed in placed relative to the connector housing. Each ferrule supports the end of at least one optical fiber or optical fiber stub spliced to an optical fiber.

The optical fiber/fiber stub can be coupled to the ferrule in any suitable way. For example, the fiber/stub can be inserted into a pre-formed axial bore of the ferrule and secured therein, e.g., with adhesive. Alternatively, the ferrule can be over-molded directly onto the fiber/stub or otherwise affixed thereto, e.g., with thermally expandable/compressible materials.

Connector housings of the present disclosure can be made integral with their ferrule or ferrules, e.g., the ferrule is molded together with the housing. Alternatively, the ferrule(s) is/are installed in the pre-made connector housing.

In accordance with certain aspects of the present disclosure, a fiber optic connector includes a unitary housing having a main body supporting a ferrule adapted to terminate an optical fiber, the unitary housing including a pair of opposing sides, each of the pair of opposing sides defining a protruding catch or shoulder, the unitary housing further comprising a release arm pivotally coupled to each of the opposing sides of the main body.

In some examples, a release bar integral with each release arm pivots with the release arm.

In some examples, a pivoting joint between each release arm and its corresponding side of the main body of the unitary housing biases the release arm towards a latching position of the connector, the release arm being pivotal away from the latching position to a release position.

In some examples, each release arm includes a pair of substantially parallel fingers, with the release bar extending between the two fingers, the fingers and release bar defining a window surrounding the protruding catch.

In some examples, each of the release arms includes a wing extending away from the main body of the housing and adapted to facilitate pivoting of the release arm.

In some examples, the main body supports a spring for axially biasing the ferrule within the main body.

In some examples, a ferrule hub engages a flexibly resilient flange within a cavity defined by the main body.

In some examples, the unitary housing defines a forward plug region defining a plug cavity; a tail region through which the optical fiber is inserted into the housing and about which can be secured a strain relief element, such as a boot; and/or an intermediate region between the plug region and the tail region. In some examples, the intermediate region is a splice region defining a cavity within the unitary housing for supporting a splice, e.g., a splice between a fiber stub and a fiber. The splice can be achieved in any suitable way, e.g., a fusion splice or a mechanical splice. Alternatively, the intermediate region can provide for optical alignment of a fiber stub and a fiber. Thus, for example, the intermediate region can house an optical alignment device. Alternatively, no splice or optical alignment device is housed within the intermediate region and/or within any portion of the unitary housing.

In some examples, the tail region includes a hollow tail piece axially extending from a back of the main body, the hollow tail piece adapted to couple to a strain relief boot.

In some examples, the fiber optic connector is adapted to releasably latch in a SC adapter or other SC connector termination receptacle, i.e., an adapter or other receptacle that meets TIA FOCIS 3 standards governing SC adapters or other receptacles. Thus, in some examples, the fiber optic connector meets at least some of the TIA FOCIS 3 standards governing SC connectors such as, e.g., interface dimension standards, ferrule standards, keying standards, etc. In some examples, the fiber optic connector meets all of the TIA FOCIS 3 standards governing SC connectors.

In some examples, the fiber optic connecter is adapted to releaseably latch in an adapter comprising a main body defining first and second connector sockets each adapted to receive the housing of a connector. The main body of the adapter can also hold a ferrule alignment mechanism including a ferrule alignment sleeve and ferrule alignment sleeve housings for receiving the ferrules of two connectors and axially aligning and optically coupling them. The ferrule alignment mechanism can include pairs of latch arms adapted to engage the protruding catches of the connector housing. The latch arms can be resiliently flexed, e.g., by engagement with outwardly pivoting release bars of the release arms of the connector in order to allow the connector to be pulled out of the socket of the adapter.

In some examples, the adapter can be supported in optical distribution equipment, such as a patch panel, the adapter acting to couple optical cables on either side of the panel. The main body of the adapter can include one or more couplers for coupling the adapter to the panel.

In accordance with still further aspects of the present disclosure, a method of removing a fiber optic connector, e.g., a SC connector, from optical distribution equipment includes applying force to a pair of release arms of the fiber optic connector to pivot the release arms about pivot joints of a unitary housing that includes the release arms and also supports a fiber optic ferrule, the force being applied towards a central axis of the fiber optic connector.

In some examples, the method further includes a subsequent step of pulling the unitary housing out of the optical distribution equipment.

In some examples, the applying force causes release bars of the unitary housing to push latching arms of the optical distribution equipment away from the central axis.

In some examples, the applying force causes protrusions of latching arms of the optical distribution equipment to disengage from protruding catches of the release arms.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
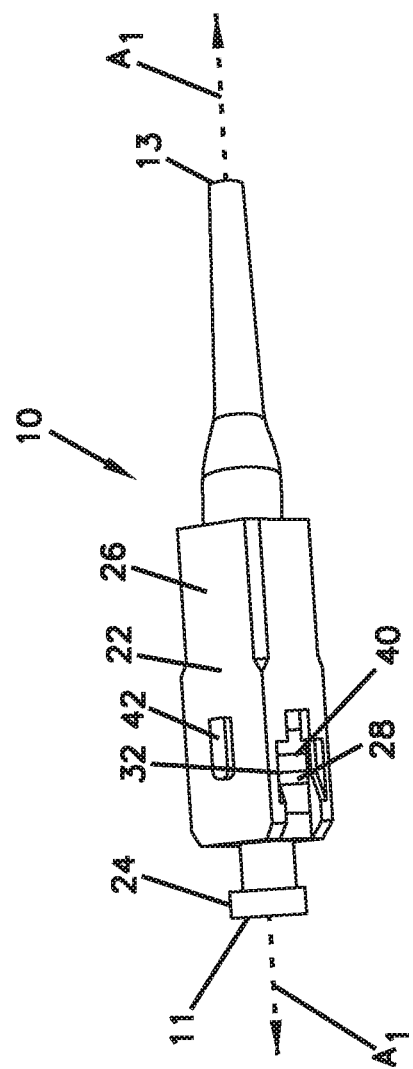
FIG. 1 is a perspective view of an example prior art SC connector.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
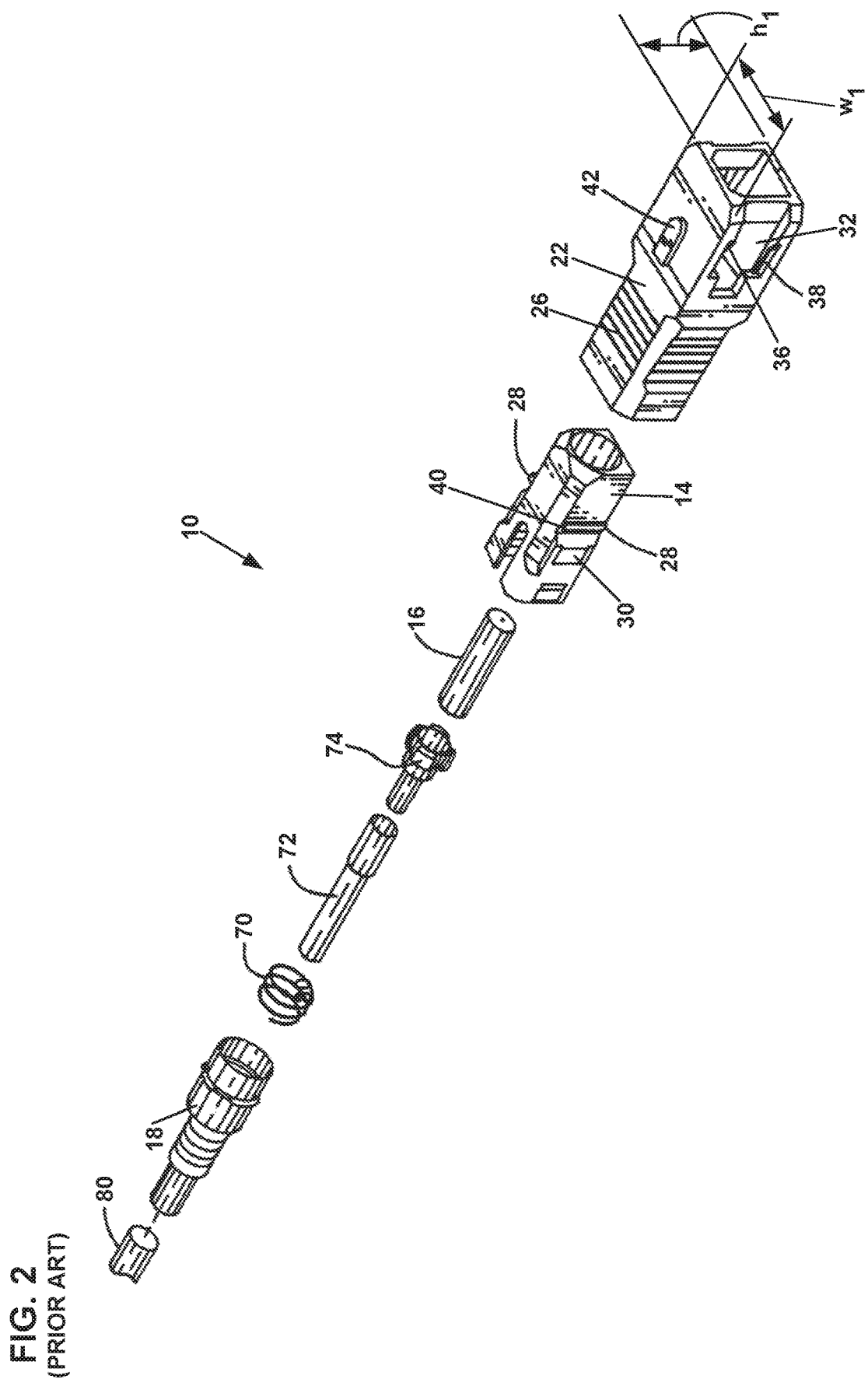
FIG. 2 is an exploded view of portions of the prior art SC connector of FIG. 1.

Referring to FIGS. 1-2, a prior art SC connector 10 axially extends along the axis A1 between a front 11 and a back 13 of the connector 10. Generally, the SC connector 10 includes a plurality of discrete parts that are assembled together to form the connector 10. The parts include, e.g., an inner housing 14 supporting a spring loaded ferrule 16, a separate rear housing 18 that is snappingly coupled to the inner housing 14 and is adapted to frictionally or snappingly mount a flexible boot 20, and an outer housing 22 positioned around the inner housing 14. As indicated, the rear housing 18 is a separate component from the inner housing 14 and the two are coupled together when assembling the connector 10. A removable dust cap 24 can be sleeved over the ferrule 16 to protect the ferrule 16 when the connector is not in use.

The outer housing 22 moves axially relative to the inner housing 14 between forward most and rearward most positions. To axially move the outer housing 22 relative to the inner housing 14, a user can grasp the finger hold 26 toward the rear of the outer housing 22.

The inner housing 14 includes a protruding catch or shoulder 28 on each of two opposing sides and a protruding stop 30 rearward of the catches 28 on each of the two opposing sides. Each of the pair of protruding catches 28 and the pair of protruding stops 30 partially extends into a window 32 on either side of the outer housing 22. The protruding catches 28 engage a forward portion of the frames of the window 32 when the outer housing 22 is in its rearward most position relative to the inner housing 14. The protruding stops 30 engage a rearward portion of the frames of the windows 32 when the outer housing 22 is in its forward most position relative to the inner housing 14.

The prior art SC connector also includes spring 70 for axially biasing the ferrule, a tube 72 that helps guide a fiber optic cable 80 to the ferrule 16, and a ferrule hub 74 that operatively retains the spring 70 within the rear housing 18 and also holds the rear of the ferrule 16.

A pair of axially extending guides 36, 38 above and below each window 32 on either side of the outer housing are adapted to engage flexible latch arms disposed in the socket of an adapter, such as the TIA compliant SC adapter 300 shown in FIG. 3 and discussed in more detail below. As the connector 10 is axially pushed forwards into the adapter socket, the guides 36, 38, engage the flexible latch arms of the adapter and spread them apart until the protruding catches 28 clear the latch arms rearwardly. As the connector continues to push forward, the guides 36, 38 then release the latch arms, allowing the latch arms to snap over the rear of the protruding catches 28 and into the notch 40 immediately behind each of the protruding catches 28, which axially stabilizes or locks the connector 10 relative to the adapter.

To remove the connector 10 from the adapter (e.g., the adapter 300 of FIG. 12), the outer housing 22 is pulled rearwards such that the guides 36 and 38 again engage the latch arms of the adapter and spread them apart (i.e., out of the notches 40) such that the latch arms can clear the protruding catches/shoulders 28 forwardly and thereby release the connector 10.

The guides 36, 38 are contoured with chamfers, peaks and troughs to provide for the latch arm engagement and disengagement described.

A keying feature 42 on the outer housing 22 can be adapted to mate with a complementary feature of the adapter to provide for coupling of connector and adapter in only one orientation.

Figure 3:
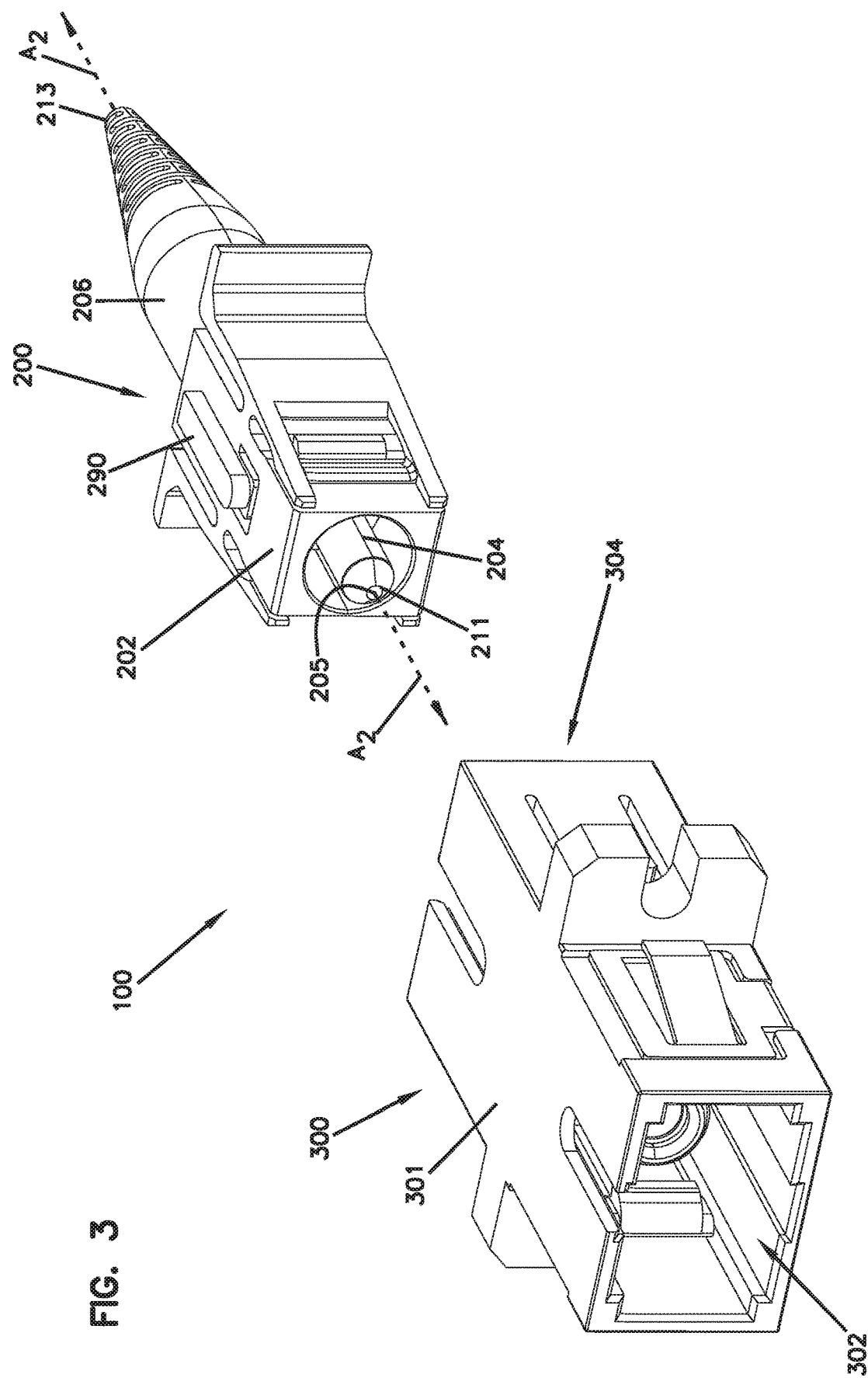
FIG. 3 is a partially exploded perspective view of an example connector and adapter assembly according to the present disclosure, the adapter being a prior art SC adapter that complies with TIA FOCIS 3 standards governing SC adapters.
Figure 4:
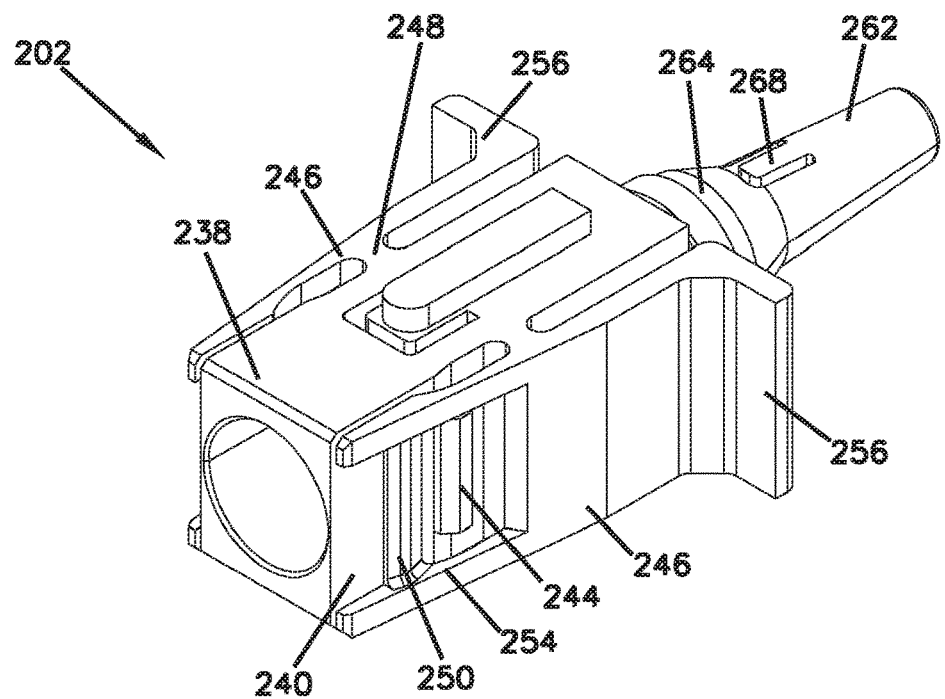
FIG. 4 is a perspective view of the unitary housing of the connector of FIG. 3.
Figure 5:
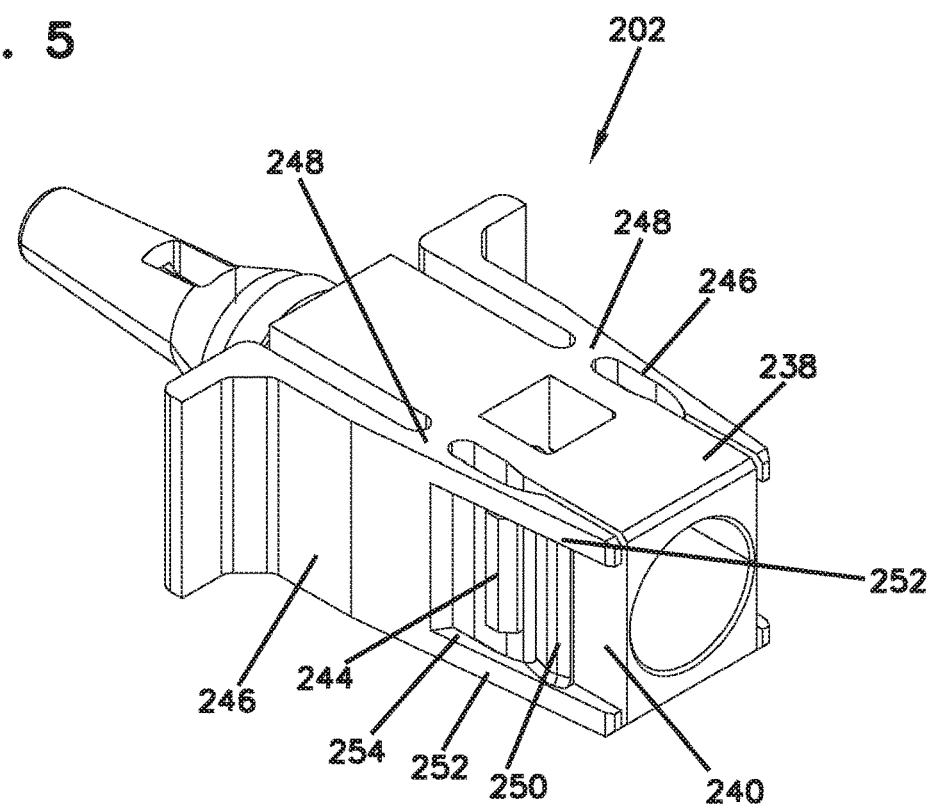
FIG. 5 is a further perspective view of the unitary housing of the connector of FIG. 3.
Figure 6:
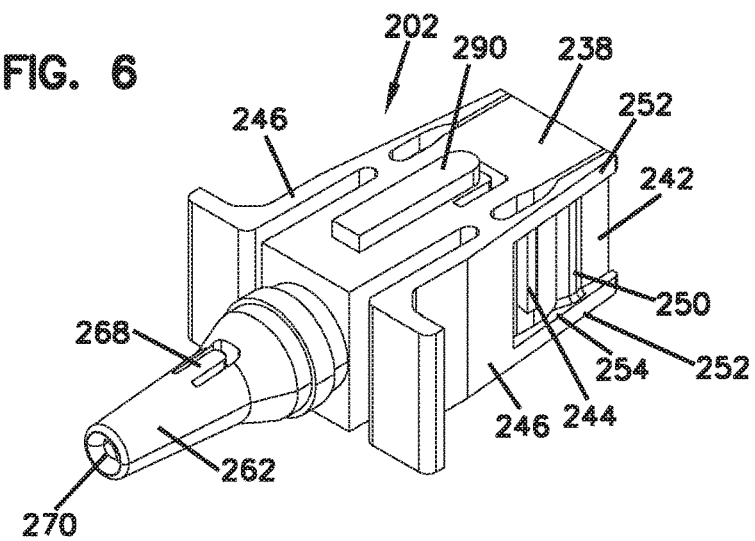
FIG. 6 is a further perspective view of the unitary housing of the connector of FIG. 3.
Figure 7:
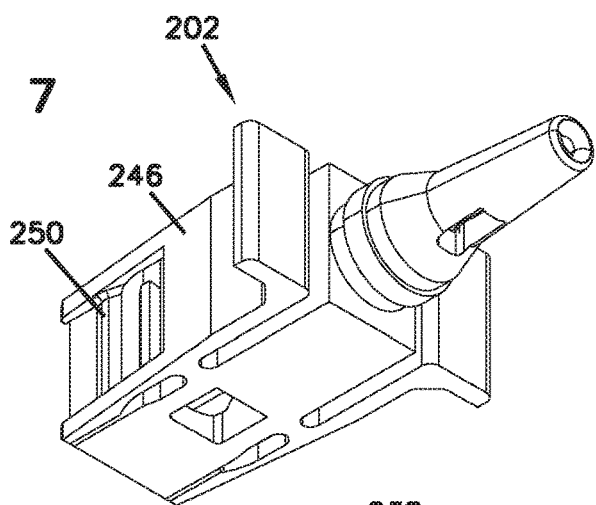
FIG. 7 is a further perspective view of the unitary housing of the connector of FIG. 3.
Figure 8:
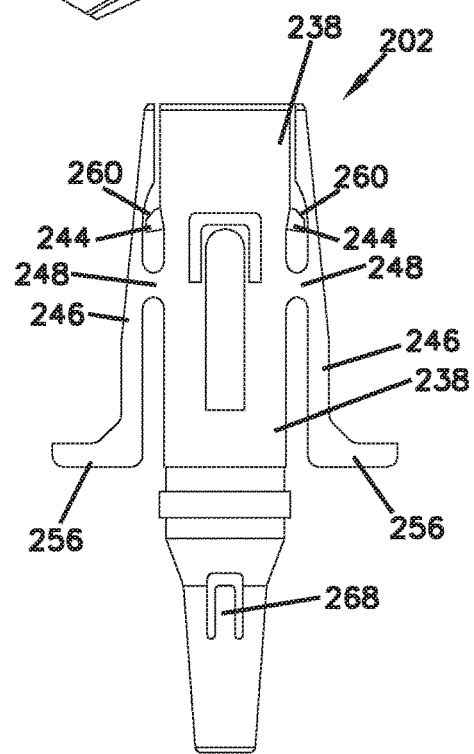
FIG. 8 is a top view of the unitary housing of the connector of FIG. 3.
Figure 9:
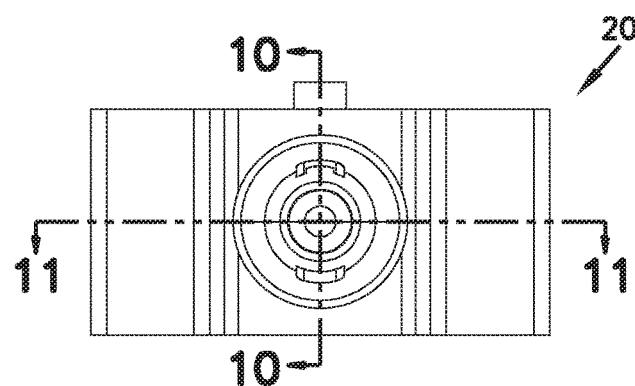
FIG. 9 is a front view of the unitary housing of the connector of FIG. 3.

Referring now to FIG. 3, a connector-adapter assembly 100 in accordance with the present disclosure includes a connector 200 and an adapter 300, the connector 200 providing one or more advantages over the prior art connector described above. The adapter 300 can be, but need not be, a standard SC adapter. In at least some examples, the adapter 300 is TIA FOCIS 3-compliant prior art SC adapter.

The connector 200 extends axially along the axis A2 between a front 211 and a back 213 of the connector 200. The connector 200 includes a unitary housing 202 supporting a ferrule 204 and a protective boot 206.

In some examples, the connector 200 is an SC connector. In some examples, the connector 200 is TIA FOCIS 3-compliant SC connector.

The ferrule 204 can be installed into the unitary housing 202 or optionally formed together with the unitary housing 202 as an integral component of the unitary housing 202. The ferrule 204 includes an axial bore 205 that receives an optical fiber, such as the optical fiber 82 shown in FIG. 15.

The protective strain relief boot 206 can prevent overbending of an optical cable (e.g., the optical cable 80 in FIG. 15 carrying the optical fiber 82) that passes through the connector 200.

The connector 200 is adapted to mate with the adapter 300, as will be described in greater detail below.

The adapter 300 includes first and second sockets 302 and 304 that face each other. Each socket 302, 304 is adapted to receive and latch a complementary connector and thereby optically couple the two connectors via their ferrule faces. Thus, if the adapter 300 is a TIA FOCIS 3-compliant SC adapter, for example, it is adapted to receive, latch and optically couple a pair of TIA FOIS 3-compliant SC connectors.

Referring now to FIGS. 4-11, the unitary housing 202 of the connector 200 extends axially along the axis A3 between its front 221 and its back 223.

The unitary housing 202 includes a main body 238 having a pair of opposing sides 240, 242, each of the pair of opposing sides defining a protruding catch 244 (protruding away from the axis A3). A release arm 246 is pivotally coupled to each of the opposing sides of the main body 238 at a pivot joint 248. A release bar 250 is integral with each of the release arms 246 and pivots with its release arm. The pivot joints 248 bias the corresponding release arm 246 towards a latching position of the connector, in which the unitary housing 202 can be latched by the latch arms of the adapter 300. The release arm 246 is also pivotal away from the latching position about the pivot joint 248 such that the release bars 250 engage and spread apart the latch arms of the adapter 300 to release the connector from the adapter and allow the connector to be pulled out of the adapter socket.

Each release arm 246 includes a pair of substantially parallel fingers 252, with the release bar 250 extending between the two fingers 252, the fingers 252 and the release bar 250 defining a window 254 surrounding the protruding catch 244.

In some examples, each of the release arms 246 includes a wing 256 extending away from the main body 238 and adapted to facilitate pivoting of the release arms 246. Thus, for example, the two wings can be squeezed towards each other, i.e., towards the main body 238, causing the fingers 252 and the release bars 250 on the other side of the pivot joint 248 to pivot outwards, i.e., away from the main body 238.

The release bars 250 can have outward (i.e., away from the axis A3) facing surfaces that are rounded or chamfered to facilitate guiding of the latch arms of the adapter past the release bars 250 such that they latch rearwardly over the protruding catches 244.

The protruding catches 244 can include chamfered or rounded forward sides 260 to facilitate latching by the latching arms of the adapter as the latching arms slide rearwardly over the protruding catches 244.

The unitary housing 202 includes a tail 262 extending rearwardly from the main body 238. The tail 262 can be configured to mate with a protective boot. The example tail 262 shown includes an annular rib 264 that can snap into a corresponding annular groove of a protective boot. The tail 262 generally tapers axially in the rearward direction.

Figure 15:
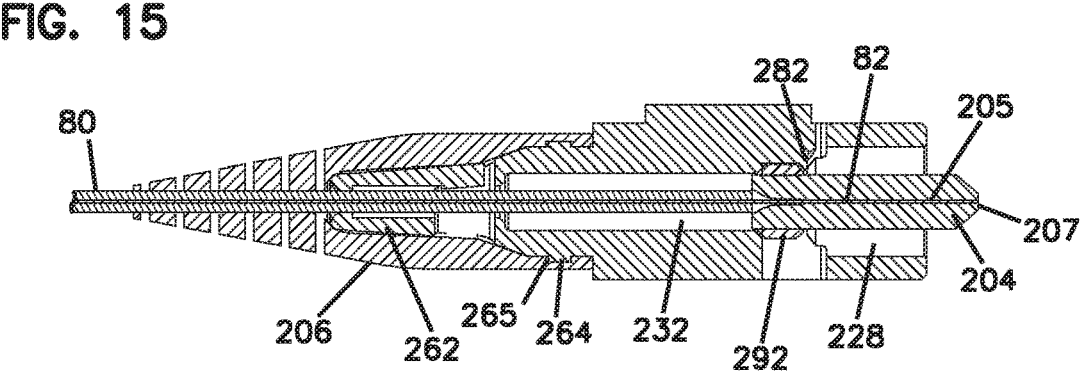
FIG. 15 is a cross-sectional view of the connector of FIG. 3 along the line 15-15 in FIG. 14, including an example optical cable carrying an optical fiber.
Figure 16:
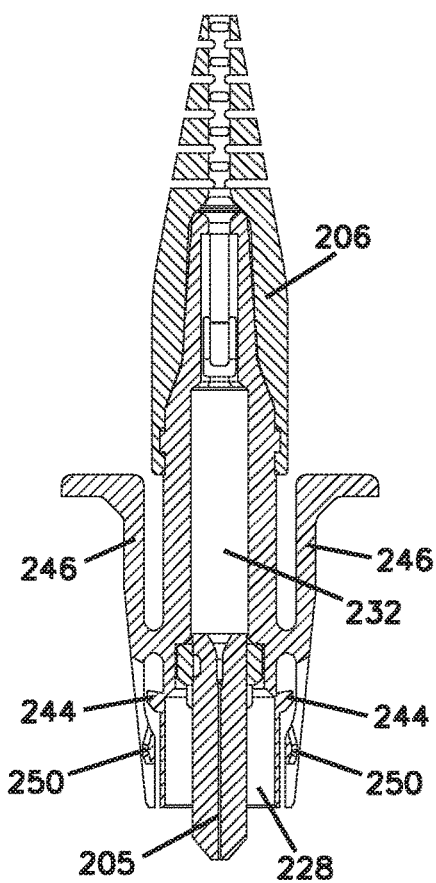
FIG. 16 is a cross-sectional view of the connector of FIG. 3 along the line 16-16 in FIG. 14.
Figure 17:
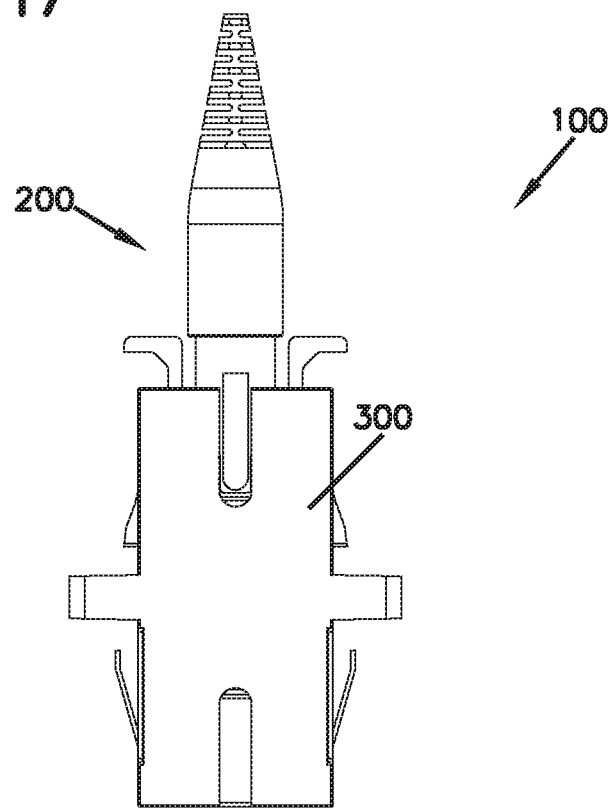
FIG. 17 is a top view of the connector assembly of FIG. 3 in an assembled configuration.
Figure 18:
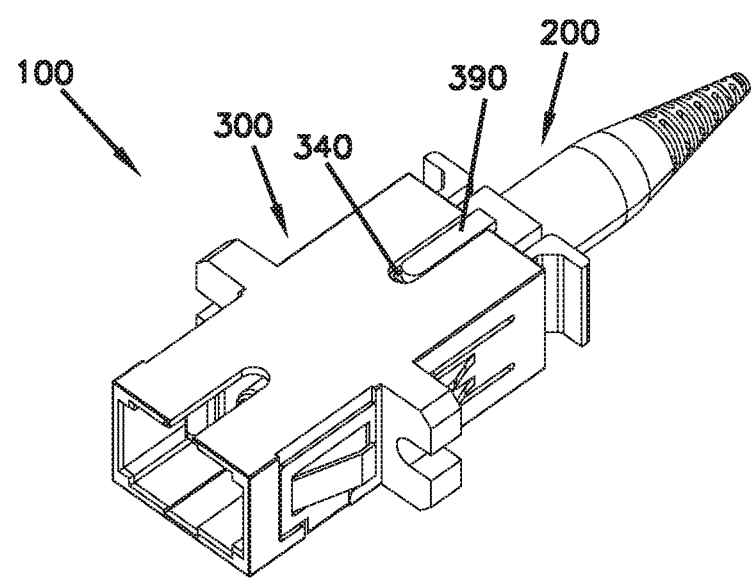
FIG. 18 is a perspective view of the connector assembly of FIG. 3 in an assembled configuration.
Figure 19:
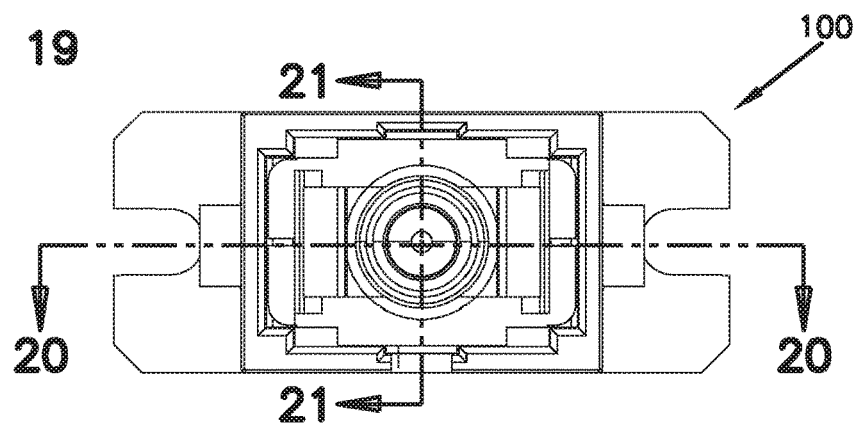
FIG. 19 is a front view of the connector assembly of FIG. 3 in an assembled configuration.
Figure 20:
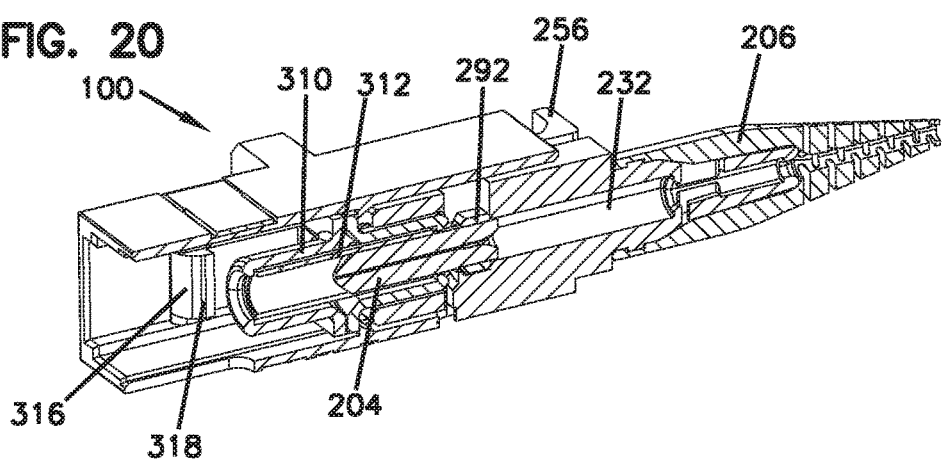
FIG. 20 is a perspective cross-sectional view of the connector assembly of FIG. 3 in an assembled configuration along the line 20-20 in FIG. 19.

A rear opening 270 in the tail 262 receives the optical fiber or optical cable 80 (FIG. 15) carrying one or more optical fibers 82 (FIG. 15). Optionally, a crimping tab 268 can be provided in the tail 262. The crimping tab 268 can be bent or crimped towards the axis A3 to aid in axially stabilizing a cable 80 within the connector 200.

Optionally, the intermediate region 224 (described in more detail below) of the unitary housing includes a ferrule hub receiving chamber 280 adapted to securely hold a ferrule hub. A flange 282 is disposed at a forward extreme of the chamber 280. The flange 282 is resiliently flexible, allowing a ferrule hub to be snapped into the chamber 280 and held there in place. Thus, for example, a ferrule can be inserted into the unitary housing 202 from the front 221 until the ferrule hub clears the flange 282, snapping into the chamber 280. Alternatively, the unitary housing 202 can be integrally formed with the ferrule, e.g., through an overmolding process.

Optionally the unitary housing 202 can include a keying feature 290 (e.g., a projection) adapted to mate with a corresponding mating feature (e.g., a slot) of an adapter. The keying relationship between the connector 200 and the adapter 300 can ensure that the connector is installed in the adapter in only one possible orientation.

In FIGS. 4-11, the release arms 246 are shown in a relaxed position, i.e., the proper position for inserting and mating the connector 200 with the adapter 300. In their relaxed position the portions of the release arms 246 forward of the pivot joint 248 are generally angled or tapered towards the main body 238 to aid the latch arms of the adapter in clearing the release arms 246 and latch over the protruding catches 244 when inserting the connector 200 in the adapter 300.

The unitary housing 202 defines a plug region 222, an intermediate region 224 disposed axially immediately behind the plug region 222 and a tail region 226 disposed axially immediately behind the intermediate region 224.

The plug region 222 defines a plug cavity 228 through which the ferrule extends. In some examples the forward face of the ferrule is positioned forward of the forward end 221 of the connector 200. In some examples, the forward face of the ferrule is recessed within the plug cavity 228.

The tail region 226 includes the tail 262 about which a flexible boot (e.g., the boot 206) can be slid over and mounted and through which is passed a portion of an optical cable.

The intermediate region 224 is disposed axially between the plug region 222 and the tail region 226. The intermediate region 224 includes a cavity 232. In some examples, the cavity 232 can hold a splice.

The interiors of the tail region 226, the intermediate region 224 and the plug region 222 are in axial communication with one another.

In some examples, a maximum height h2 of the plug region 222 is equal to the height h1 (FIG. 2) of a standard TIA FOCIS 3-compliant SC connector, including the standard TIA FOCIS 3-compliant SC connector's inner housing and outer housing. Likewise, in some examples a maximum width w2 of the portion of the unitary housing 202 that is inserted into an adapter socket is equal to the corresponding maximum width w1 (FIG. 2) of a standard TIA FOCIS 3-compliant SC connector.

Figure 12:
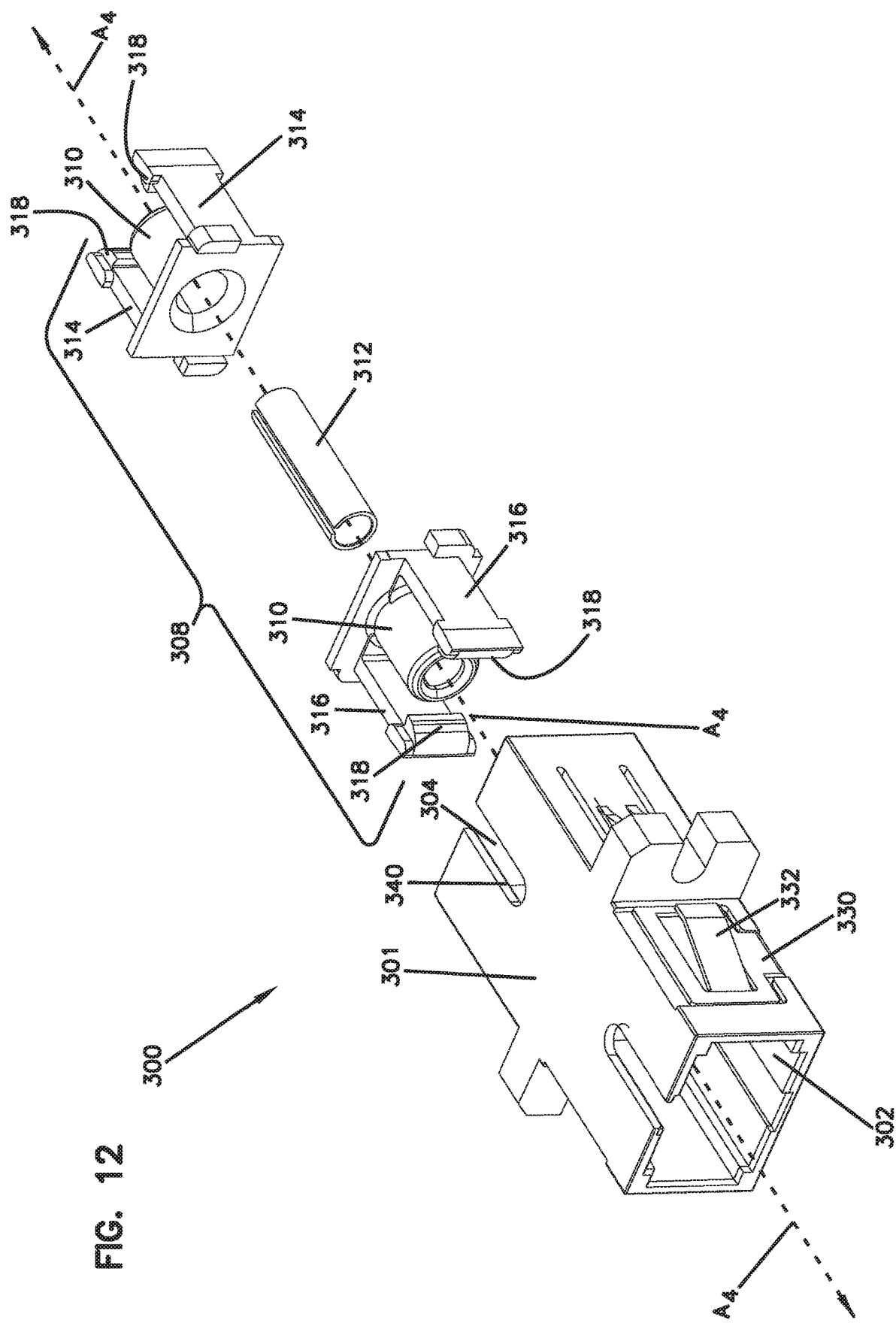
FIG. 12 is a partially exploded view of the adapter of FIG. 3.
Figure 13:
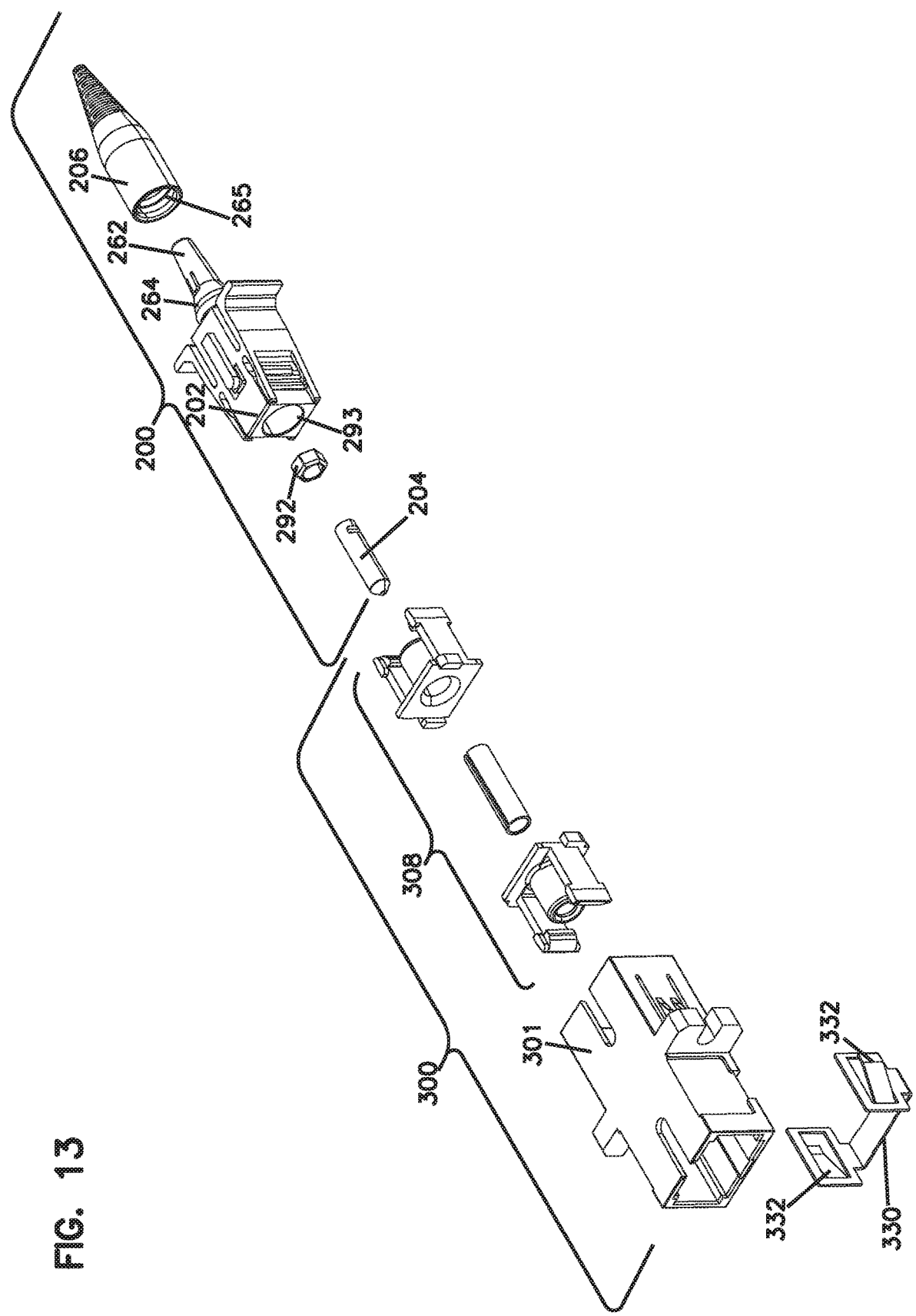
FIG. 13 is an exploded view of the assembly of FIG. 3.
Figure 14:
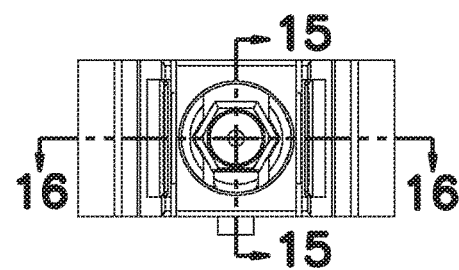
FIG. 14 is a front view of the connector of FIG. 3.

Referring now to FIG. 12, the adapter 300 includes a main body 301 defining first and second connector sockets 302 and 304 each adapted to receive the unitary housing 202 of a connector 200.

Within the main body 301 is held a ferrule alignment mechanism 308 including a ferrule alignment sleeve 312 and ferrule alignment sleeve housings 310 for receiving the ferrules of two connectors and axially aligning and optically coupling them.

The ferrule alignment mechanism 308 includes pairs of latch arms 314 and 316 extending parallel to the axis A4 of the adapter 300 and adapted to engage the protruding catches 244 of the connector housing. The latch arms 314 and 316 are positioned relative to their corresponding alignment sleeve housing 310 such that projections 318 (projecting toward the axis A4) on the latch arms 314, 316 will latch over the protruding catches 244 of the connector 200 when the connector 200 is properly inserted in the adapter socket and the ferrule properly inserted in the alignment sleeve 312. The latch arms 314, 316 can be resiliently flexed outward (i.e., away from the axis A4) when, e.g., pushed outward by the release bars 250 of the release arms 246 of the connectors.

The surfaces of the projections 318 can be rounded or chamfered to assist in guiding the projections to their latching position rearward of the protruding catches 244 of the connector 200.

The main body 301 can include a keying slot 340 adapted to receive the keying feature 290 of the connector 200. The main body 301 can also include a coupler 330 having flexible coupling arms for coupling the adapter to distribution equipment, such as a patch panel.

Figure 10:
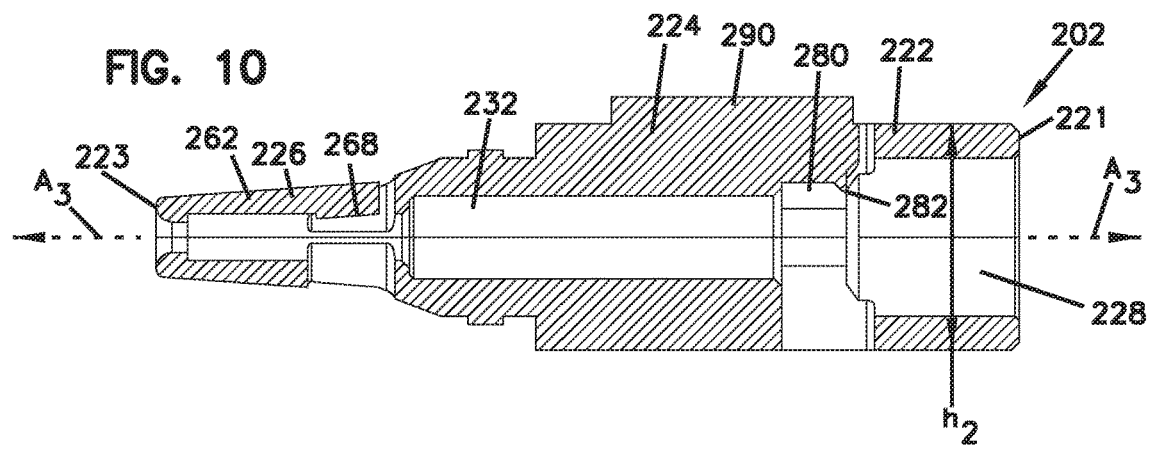
FIG. 10 is a cross-sectional view of the unitary housing of the connector of FIG. 3 along the line 10-10 in FIG. 9.
Figure 11:
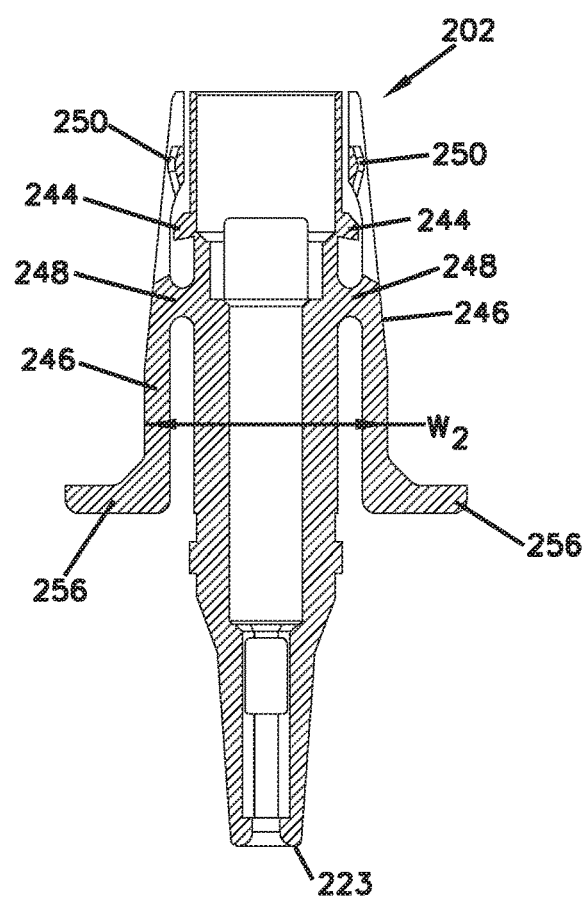
FIG. 11 is a cross-sectional view of the unitary housing of the connector of FIG. 3 along the line 11-11 in FIG. 9.

Referring now to FIGS. 13-16, a ferrule hub 292 is seated at the rear of the ferrule 204. An assembly of the ferrule 204 and ferrule hub 292 can be inserted rearwardly through the forward opening 293 of the unitary housing 202 and snap-mounted in the ferrule hub receiving chamber 280 (FIG. 10) by pushing the ferrule hub rearward past the flange 282 (FIG. 10). The ferrule includes an end face 207 that facilitates optically coupling an optical fiber passing through its bore 205 with another ferruled fiber, e.g., with an alignment sleeve of an adapter.

An optical cable 80, e.g., a 900 micron cable carrying, e.g., a 250 micron coated optical fiber 82 passes through the connector from the rear, the outer layers of the cable 80 being stripped where the fiber 82 enters the ferrule bore 205 of the ferrule 204.

Referring now to FIGS. 17-24, a connector 200 is shown latched into an adapter 300, with the keying feature 290 mated with the keying slot 340.

In FIGS. 17-24, just the socket 304 of the adapter 300 has been fitted with a connector 200. To provide optical coupling between optical connectors, a second optical connector can be fitted into the empty socket 302. In some examples, the ferrules of both connectors in the adapter are axially spring loaded to provide for sufficient contact of the fibers and sufficient signal transmission between the fibers. In some examples, just the ferrule of one of the connectors is axially spring loaded, and the ferrule of the other connector is not axially spring loaded. In FIGS. 17-24 the ferrule 204 is not axially spring loaded, and a ferrulized connector installed in the socket 302 could be axially spring loaded. In still further examples, neither ferrulized connector is axially spring loaded.

On either side of the unitary housing 202 a projection 318 of a latch arm 314 is latched over the corresponding protruding catch 244 of the unitary housing 202. In the coupled configuration shown, in which the release arms 246 are in their relaxed configuration, the release bars 250 either do not contact the latch arms 314 or, alternatively, the release bars 250 do contact the latch arms 214 but apply limited force thereto such that the projections 318 securely latch onto the protruding catches 244.

To release and pull out the connector 200 from the socket 304, the user can squeeze the release arms 246 together, e.g., by apply force towards the central axis A5 in the direction of the arrows 102 (FIG. 24) to the wings 256, causing the fingers 252 to pivot away from the central axis A5 about the pivot joints 248 in the direction of the arrows 104. As the fingers 252 pivot away from the central axis A5 the release bars 250 contact and apply force to the latch arms 314 in the direction of the arrows 104, spreading the latch arms 314 apart such that the projections 318 disengage the protruding catches 244, allowing the connector 200 to be pulled out of the socket 304 in the direction of the arrow 106 (along the central axis A5). Once the wings 256 are released, the release arms 246 return to their relaxed position relative to the unitary housing 202.

Figure 21:
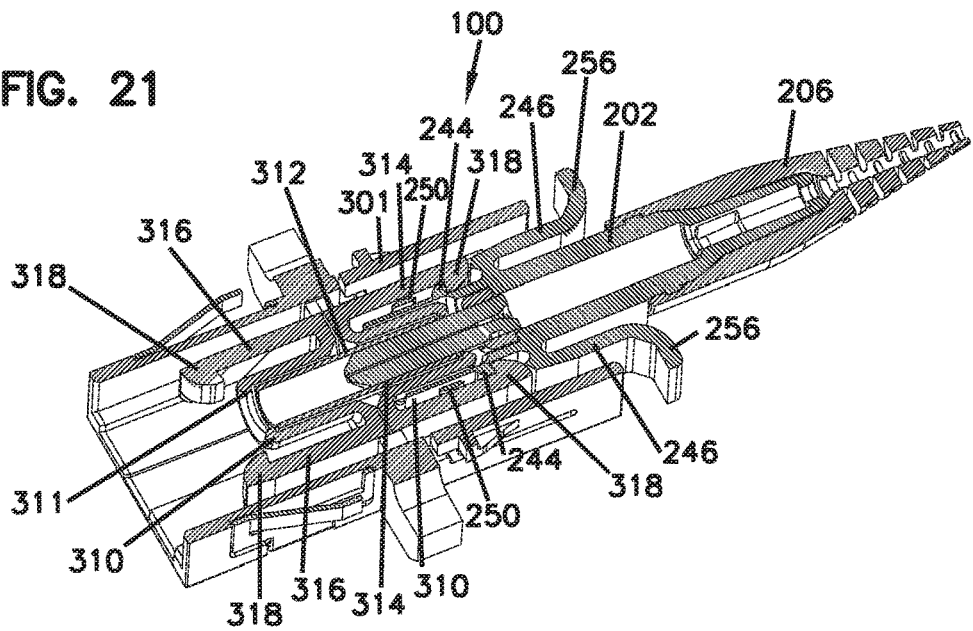
FIG. 21 is a perspective cross-sectional view of the connector assembly of FIG. 3 in an assembled configuration along the line 21-21 in FIG. 19.
Figure 22:
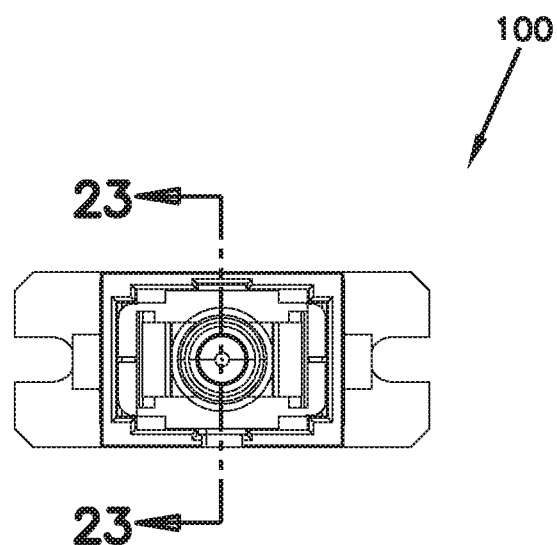
FIG. 22 is a front view of the connector assembly of FIG. 3 in an assembled configuration.
Figure 23:
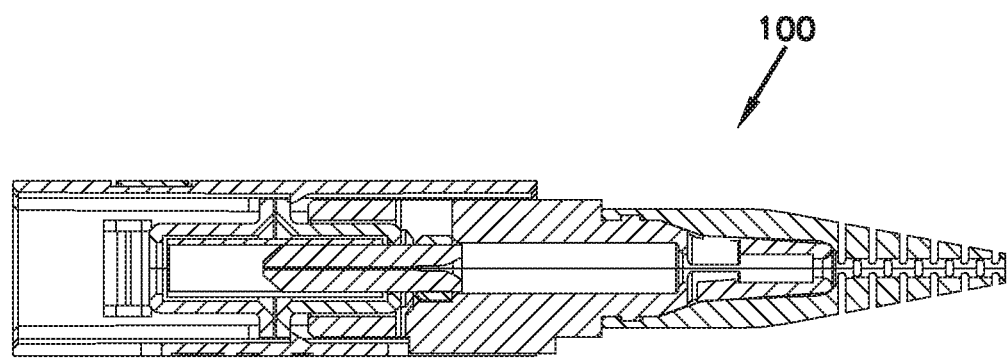
FIG. 23 is a cross-sectional view of the connector assembly of FIG. 3 in an assembled configuration along the line 23-23 in FIG. 22.
Figure 24:
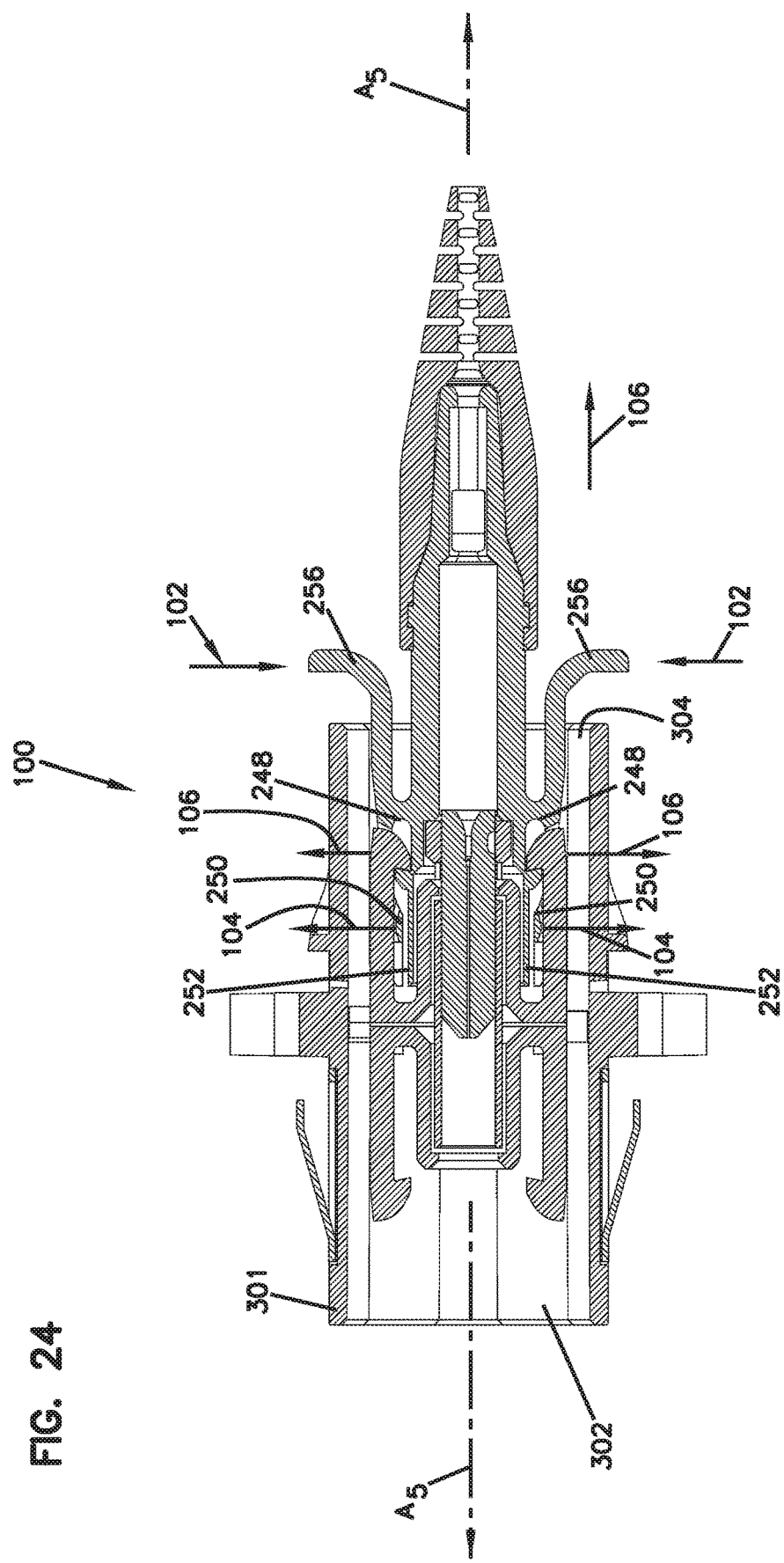
FIG. 24 is a cross-sectional view of the connector assembly of FIG. 3 in an assembled configuration along the line 24-24 in FIG. 22.

Referring to FIG. 21, the alignment sleeve housings 310 can include a retaining lip 311 protruding toward the central axis to help retain the alignment sleeve 312 within the alignment sleeve housings 310. In some examples, the alignment sleeve housings 310 can be flexibly resilient to promote insertion, removal and replacement of the alignment sleeve 312.

Although in the foregoing description, terms such as "top," "bottom," "front," and "back"/"rear" were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic connector, comprising:
 a housing defining a central axis extending from a rear end of the housing to a front end of the housing, the housing including:
  a main body supporting a ferrule positioned at the front end of the housing and adapted to terminate an optical fiber;
  a catch protruding away from the main body; and
  a release mechanism pivotally connected to the main body at a pivot joint positioned rearward of the catch, the release mechanism including:
   fingers extending from the pivot joint;
   a release bar extending from one of the fingers to the other of the fingers and positioned forward of the catch, the fingers and the release bar defining a window aligned with the catch along a reference line perpendicular to the central axis; and
   an arm portion extending from the pivot joint, the release mechanism being configured such that pushing of the arm portion towards the central axis causes the fingers and the release bar to move away from the central axis.

2. The fiber optic connector of claim 1,
 wherein the catch is positioned on a first side of the main body; and
 wherein the release mechanism is positioned on the first side, the fiber optic connector further comprising, on a second side of the main body opposite the first side:
  another catch protruding away from the main body; and
  another release mechanism pivotally connected to the main body at another pivot joint positioned rearward of the another catch, the another release mechanism including:
   other fingers extending from the another pivot joint;
   another release bar extending from one of the another fingers to the other of the another fingers and positioned forward of the catch, the another fingers and the another release bar defining another window aligned with the another catch along the reference line; and another arm portion extending from the another pivot joint, the another release mechanism being configured such that pushing of the another arm portion towards the central axis causes the other fingers and the another release bar to move away from the central axis.

3. The fiber optic connector of claim 1, wherein the fingers are parallel to each other and the release bar is perpendicular to the fingers.

4. The fiber optic connector of claim 1, wherein the arm portion includes a wing extending away from the main body and adapted to facilitate pivoting of the release mechanism.

5. The fiber optic connector of claim 1, wherein the main body supports a spring for axially biasing the ferrule within the main body along the central axis.

6. The fiber optic connector of claim 1, wherein the fiber optic connector does not include a spring for axially biasing the ferrule along the central axis.

7. The fiber optic connector of claim 1, wherein the housing defines:

a forward plug region that receives the ferrule;

a tail region; and an intermediate region between the plug region and the tail region, the pivot joint projecting from the intermediate region.

8. The fiber optic connector of claim 1, wherein the fingers extend to the front end of the housing.

9. The fiber optic connector of claim 1, wherein the fingers are not connected to each other forward of the release bar.

10. The fiber optic connector of claim 1, wherein the fingers are angled toward the central axis as they extend forwardly.

11. The fiber optic connector of claim 1, wherein the housing conforms to all TIA FOCIS 3 SC connector requirements.

12. The fiber optic connector of claim 1, wherein the housing is a unitary housing.

13. The fiber optic connector of claim 1, wherein the catch protrudes away from the main body perpendicularly to the central axis.

* * * * *